(12) United States Patent
Kato

(10) Patent No.: US 6,454,684 B2
(45) Date of Patent: Sep. 24, 2002

(54) AUTOMATIC TOOL CHANGING APPARATUS

(75) Inventor: Heizaburo Kato, Shizuoka (JP)

(73) Assignee: Sankyo Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/911,308

(22) Filed: Jul. 23, 2001

(30) Foreign Application Priority Data

Jul. 25, 2000 (JP) .......................................... 2000-224433

(51) Int. Cl.7 .............................................. B23Q 3/157
(52) U.S. Cl. .............................. 483/41; 483/38; 483/40; 483/48; 483/50
(58) Field of Search ............................. 483/41, 38, 40, 483/42, 43, 39, 48, 50, 49, 44, 46

(56) References Cited

U.S. PATENT DOCUMENTS

| | | | | |
|---|---|---|---|---|
| 4,833,770 A | * | 5/1989 | Esser et al. ................... | 483/41 |
| 5,194,061 A | * | 3/1993 | Lechleiter et al. ............ | 483/41 |
| 5,885,200 A | * | 3/1999 | Sugihara et al. .............. | 483/41 |

FOREIGN PATENT DOCUMENTS

| | | | | |
|---|---|---|---|---|
| JP | 58-71042 | * | 4/1983 | ................... 483/40 |
| JP | 60-150936 | * | 8/1985 | ................... 483/41 |
| JP | 360-146638 | * | 8/1985 | ................... 483/40 |
| JP | 40-4105838 | * | 4/1992 | ................... 483/41 |
| JP | 8-187640 | * | 7/1996 | ................... 483/41 |
| JP | 8-323575 | | 12/1996 | |
| JP | 9-300158 | | 11/1997 | |

* cited by examiner

Primary Examiner—William Briggs
(74) Attorney, Agent, or Firm—Harness, Dickey & Pierce, P.L.C.

(57) ABSTRACT

Disclosed is an automatic tool changing apparatus which comprises a tool magazine storing a multiplicity of tools each held by tool holding means, the tool magazine having a tool port through which the tools are loaded into or unloaded from the tool magazine; a tool shifter translating the tools for loading into or unloading from the tool magazine; a standby magazine having tool holding means by which the tools loaded or unloaded by the tool shifter are temporarily held and stand by; and an automatic tool changer changing the tool held in the standby magazine for the tool fitted to a spindle. The standby magazine has a plurality of tool holding means which are provided on an output shaft of a rotation indexing mechanism and which come to rest at delivery positions and to/from the tool shifter and the automatic tool changer, respectively.

9 Claims, 13 Drawing Sheets

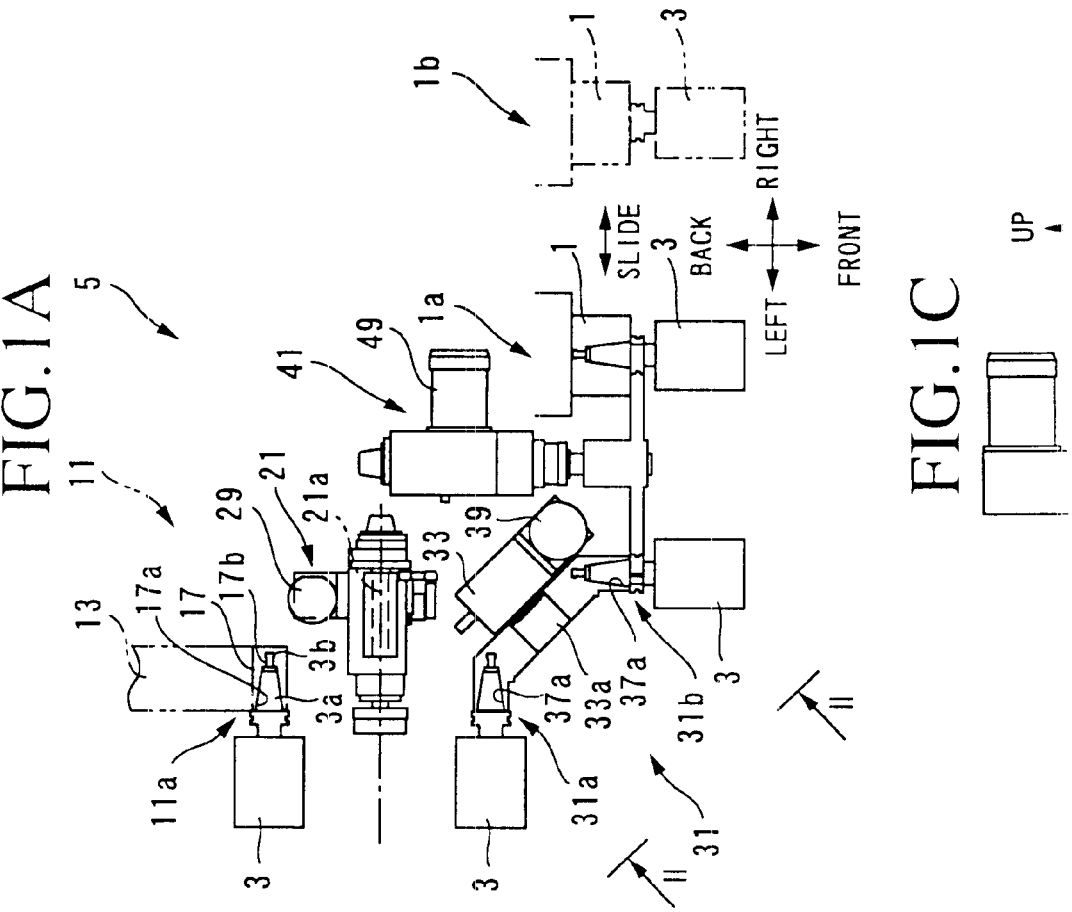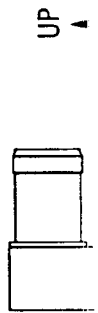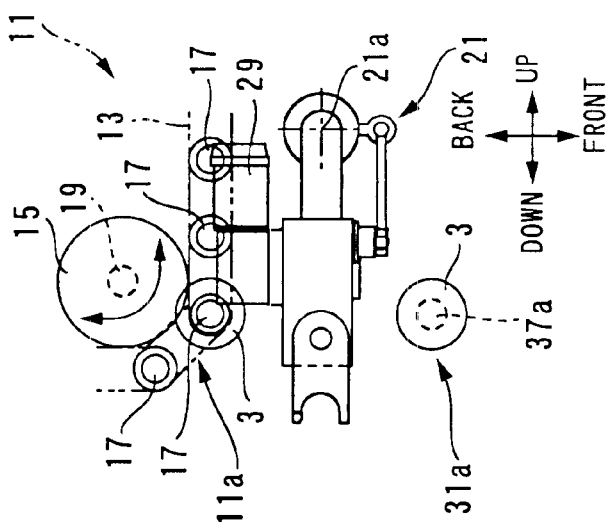

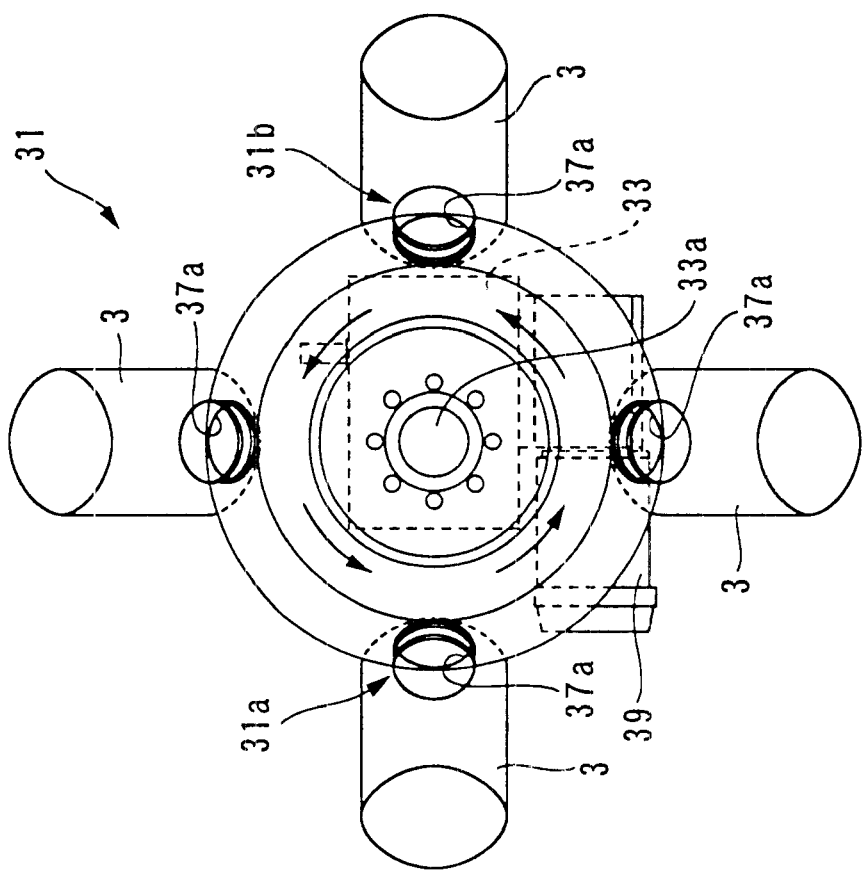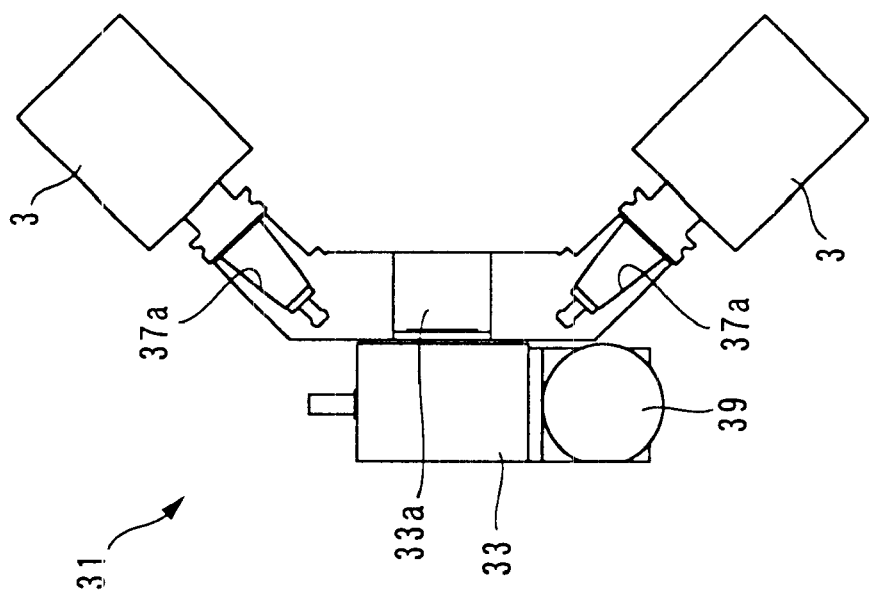

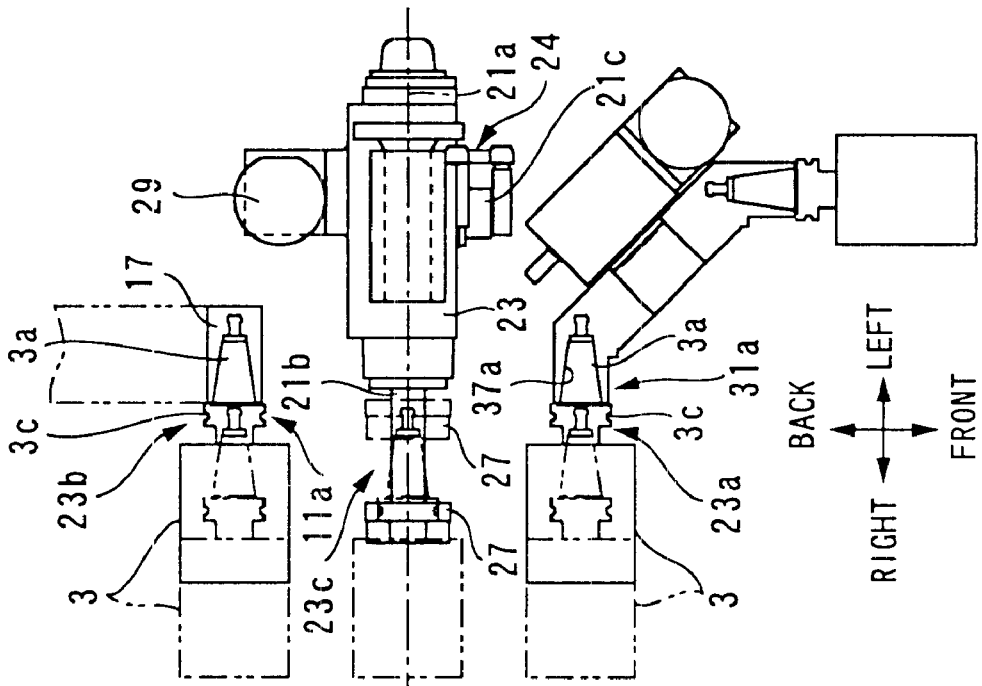
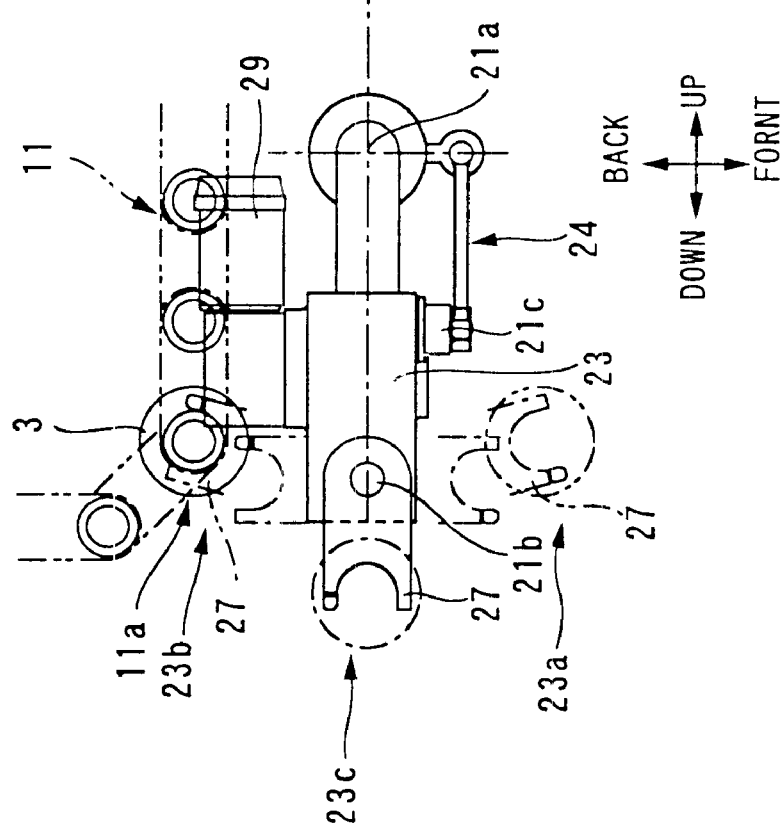

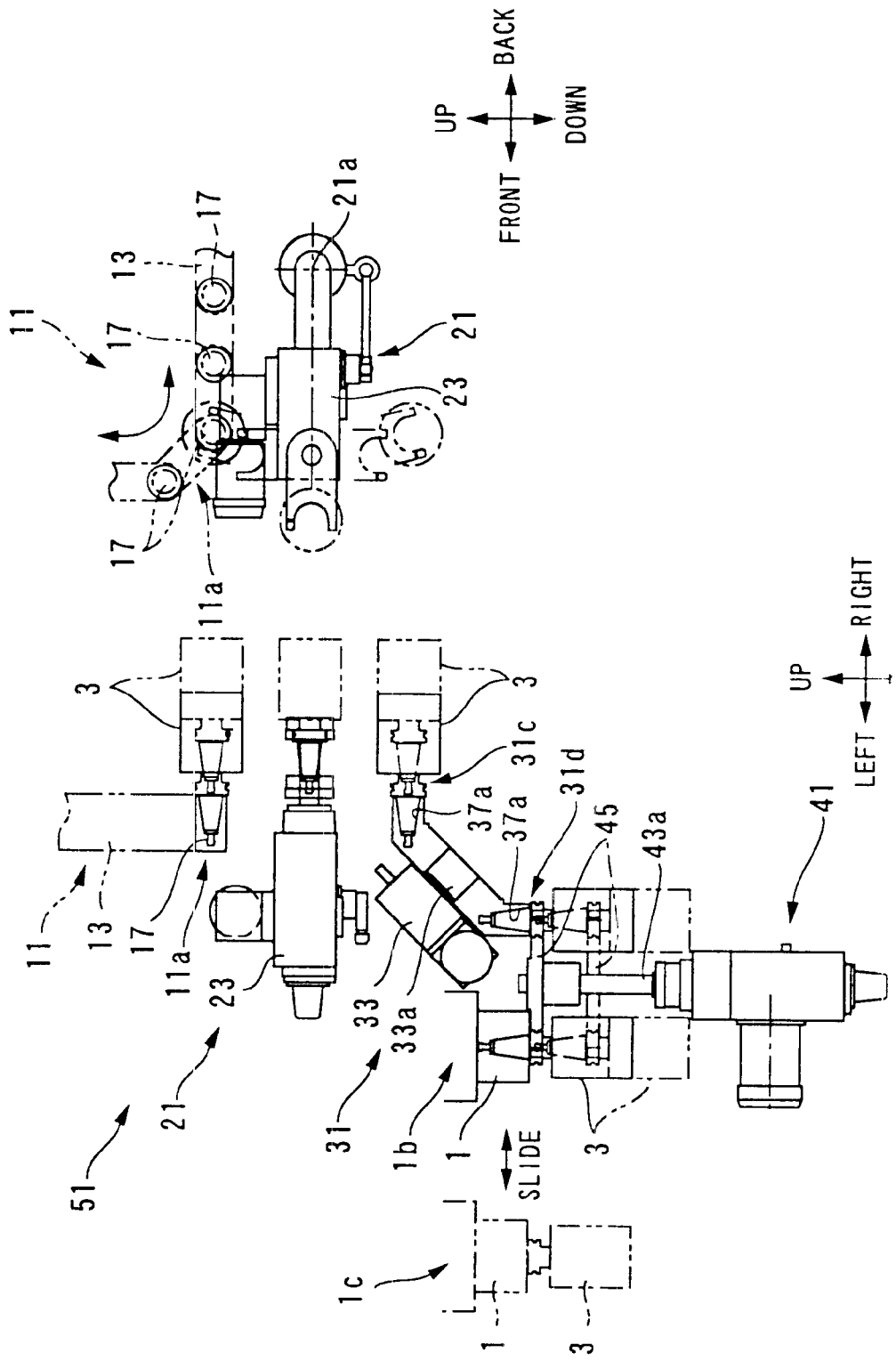

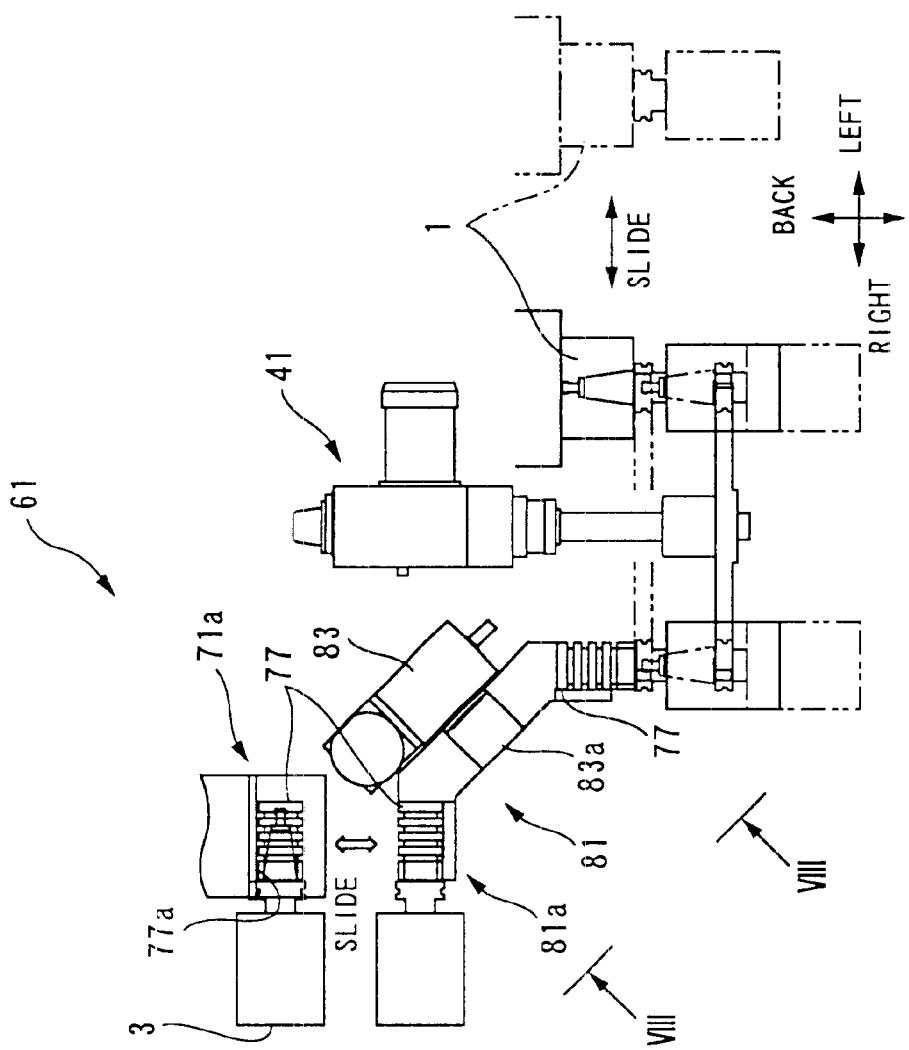
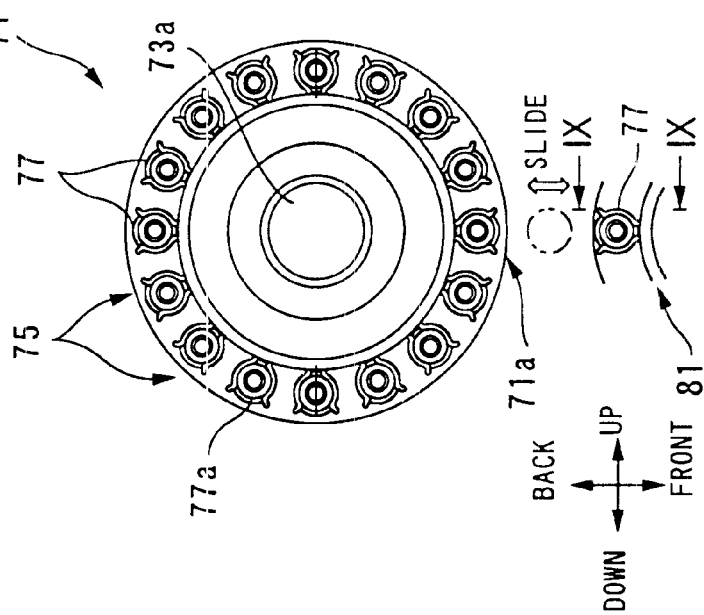
FIG.7A
FIG.7B

FIG.10B
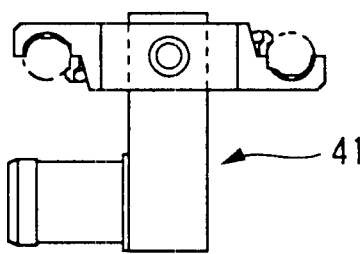
FIG.10A
FIG.10C
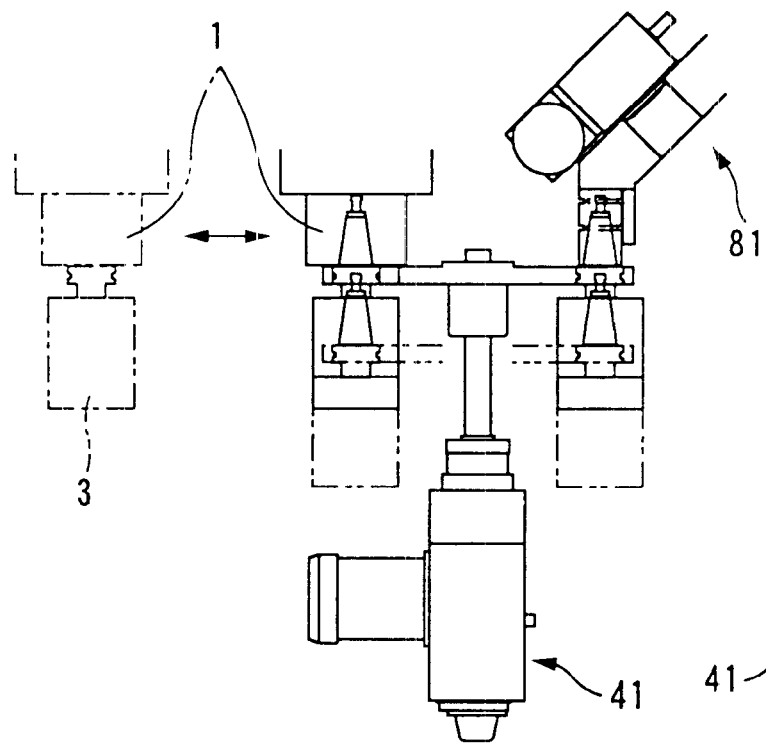
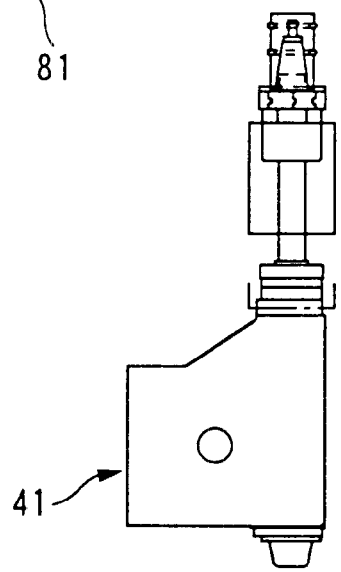

US 6,454,684 B2

AUTOMATIC TOOL CHANGING APPARATUS

BACKGROUND OF THE INVENTION

The machining center has hitherto been used which is arranged to extract and deliver an appropriate tool depending on the machining step from a multiplicity of tools stored in a tool magazine, to thereby change a spindle tool for the delivered one to machine a workpiece. The productivity of the machining center has been enhanced by e.g., increasing the tool change speed.

The tool change is effected by an automatic tool changing apparatus 101 as shown in FIG. 13.

The tool magazine is designated at 103 and comprises a multiplicity of tool pots 103b acting as tool holding means which are linked to an endless chain 103a and individually store various types of tools 105. A standby pot 109 acting as the tool holding means is interposed between the tool magazine 103 and a spindle 107 so that a tool 105a can be held in proximity to the spindle 107.

A tool shifter 111 is disposed laterally of the tool magazine 103 to deliver a tool from the tool magazine 103 to the standby pot 109 and vice versa. An automatic tool changer (ATC) 113 is provided between the standby pot 109 and the spindle 107 to change a tool 105b of the spindle 107 for the tool 105a held by the standby pot 109.

In such an automatic tool changing apparatus 101, during the machining of the workpiece, a used tool is returned from the standby pot 109 to the tool magazine 103 and a tool to next be used is delivered from the tool magazine 103 for preparation in the standby pot 109 so that the tool change time is reduced with a shortened work interruption time to thereby improve its productivity.

In the event that the tool change cycle is short as a result of brief machining steps in succession, however, delivery of the tool to next be used to the standby pot 109 may delay, resulting in a wait for delivery of the tool, which may impair its productivity.

SUMMARY OF THE INVENTION

According to the present invention, there is provided an automatic tool changing apparatus comprising a tool magazine which stores a multiplicity of tools each held by tool holding means, the tool magazine having a tool port through which the tools are loaded into or unloaded from the tool magazine; a tool shifter which is provided laterally of the tool port, the tool shifter translating the tools for loading into or unloading from the tool magazine; a standby magazine which has tool holding means by which the tools loaded or unloaded by the tool shifter are temporarily held and stand by; and an automatic tool changer which is arranged to change the tool held in the standby magazine for the tool fitted to a spindle, the tool shifter translating the tools for delivering operations between the tool magazine and the standby magazine, the automatic tool changer also translating the tools for delivering operations between the standby magazine and the spindle, wherein the standby magazine has a plurality of the tool holding means which are provided on an output shaft of a rotation indexing mechanism and which come to rest at respective delivery positions to/from the tool shifter and the automatic tool changer, and wherein the tool holding means of the standby magazine are provided to hold the tool such that the axis of the tool held thereby tilts at a predetermined angle relative to the rotational axis of the output shaft so that the direction of axis of the tool upon the translation by the tool shifter is different from the direction of axis of the tool upon the translation by the automatic tool changer.

BRIEF DESCRIPTION OF THE DRAWINGS

FIGS. 1A to 1C illustrate the major part of an automatic tool changing apparatus in accordance with a first embodiment of the present invention, FIG. 1A being a top plan view of the same, FIG. 1B being a side elevational view of a tool shifter, and FIG. 1C being a front elevational view of an ATC;

FIG. 2A is a diagram of a standby magazine viewed from line II—II of FIG. 1A, and FIG. 2B is a sectional view of the standby magazine taken along the center thereof;

FIG. 3A is a top plan view of the tool shifter in accordance with the first embodiment, and FIG. 3B is a side elevational view of the same;

FIGS. 5A and 5B illustrate the major part of an automatic tool changing apparatus in accordance with a second embodiment of the present invention, FIG. 5A being a front elevational view of the same, and FIG. 5B being a side elevational view of a tool shifter;

FIGS. 7A and 7B illustrate the major part of an automatic tool changing apparatus in accordance with a third embodiment of the present invention, FIG. 7A being a top plan view of the same, and FIG. 7B being a side elevational view of a tool magazine;

FIGS. 10A, 10B and 10C illustrate, in front elevation, top plan and side elevation, respectively, an example of application of an upright machining center of the third embodiment;

DETAILED DESCRIPTION

Figure 4A:
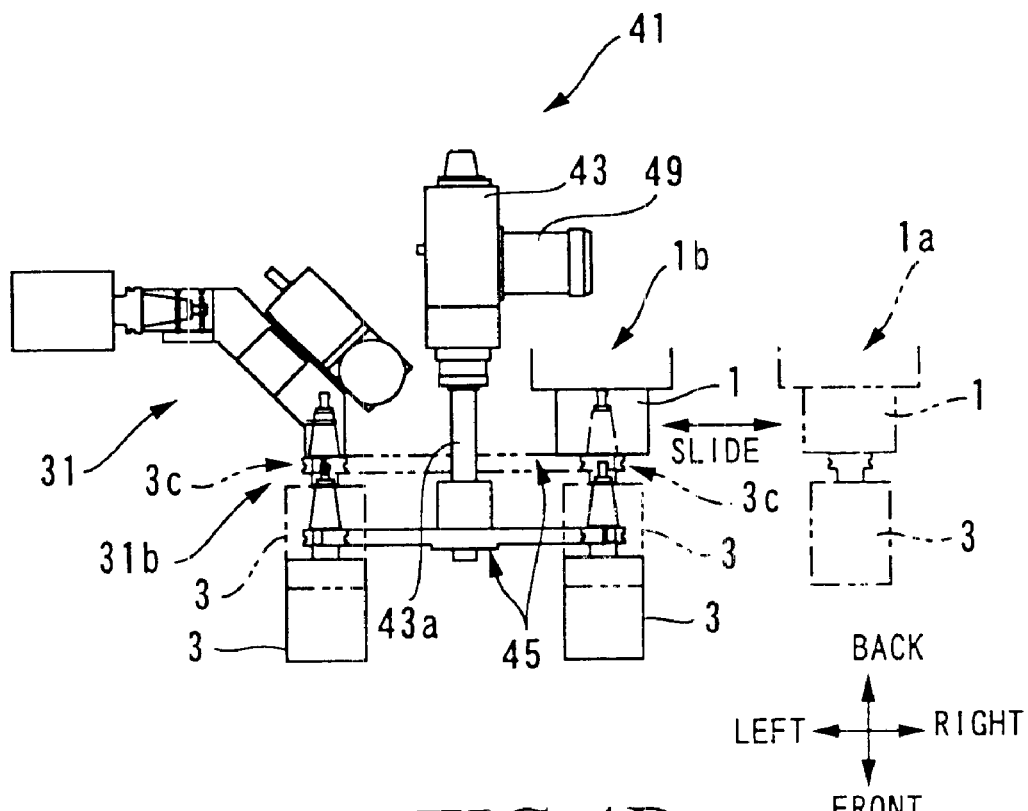
FIG. 4A is a top plan view of the ATC in accordance with the first embodiment.

There is provided an automatic tool changing apparatus of claim 1 comprising a tool magazine which stores a multiplicity of tools each held by tool holding means, the tool magazine having a tool port through which the tools are loaded into or unloaded from the tool magazine; a tool shifter which is provided laterally of the tool port, the tool shifter translating the tools for loading into or unloading from the tool magazine; a standby magazine which has tool holding means by which the tools loaded or unloaded by the tool shifter are temporarily held and stand by; and an automatic tool changer which is arranged to change the tool held in the standby magazine for the tool fitted to a spindle, the tool shifter translating the tools for delivering operations between the tool magazine and the standby magazine, the automatic tool changer also translating the tools for delivering operations between the standby magazine and the spindle, wherein the standby magazine has a plurality of the tool holding means which are provided on an output shaft of a rotation indexing mechanism and which come to rest at respective delivery positions to/from the tool shifter and the automatic tool changer, and wherein the tool holding means of the standby magazine are provided to hold the tool such that the axis of the tool held thereby tilts at a predetermined angle relative to the rotational axis of the output shaft so that the direction of axis of the tool upon the translation by the tool shifter is different from the direction of axis of the tool upon the translation by the automatic tool changer.

According to the above aspect of the present invention as defined in claim 1, the standby magazine equipped with a plurality of tool holding means is disposed between the spindle and the tool magazine, with the result that it is possible to stock, in proximity to the spindle, not merely a tool to next be used but also other tools to subsequently be used and to instantaneously transfer the tool to the delivery position to/from the automatic tool changer with the aid of the rotation indexing mechanism of the standby magazine. This allows the tool to next be used to constantly securely stand by at the delivery position to/from the automatic tool changer. The used tools held in the standby magazine can be transferred to the tool magazine during a long machining step.

Thus, there is no need to return the used tool to the tool magazine and extract the next tool for each tool change, preventing the wait for the tool from occurring in spite of brief machining steps in succession.

Some of the plurality of tool holding means of the standby magazine can be stored as frequently used tools so that these tools need not be returned to the tool magazine for each use of the tools, thereby reducing energy consumption by the apparatus which may occur upon the tool transfer.

Furthermore, the tool holding means of the standby magazine are arranged to hold the tool such that the axis of the tool held thereby tilts at a predetermined angle relative to the rotational axis of the output shaft, so that the direction of the axis of the tool held can be changed depending on the rotational angle. This means that the direction of the tool can be changed as a result of rotation of the standby magazine. For this reason, in the process of indexing the tool from the delivery position to/from the tool shifter to the delivery position to/from the automatic tool changer, the direction of the axis of the tool can simultaneously be changed, with the result that there is no need to separately provide a direction changer for changing the direction of the axis of the tool even in the case where the direction of the axis of the tool held by the tool magazine is different from the direction of the axis of the tool fitted to the spindle, thus contributing to a simplified constitution of the automatic tool changing apparatus.

In the automatic tool changing apparatus of claim 1, the invention as defined in claim 2 is characterized in that the plurality of tool holding means of the standby magazine are arranged circumferentially equidistantly around the output shaft.

According to the present invention, the plurality of tool holding means are arranged equiangularly around the output shaft, so that any tools can be held by any tool holding means irrespective of the size of the tool head.

In this case, like the invention as defined in claim 3, the number of the plurality of tool holding means included in the automatic tool changing apparatus of claim 2 may be 2n (n is a natural number), with the rotation indexing mechanism having an indexing rotation angle of 360/2n degrees.

In the automatic tool changing apparatus of claim 1, the invention as defined in claim 4 is characterized in that the tool holding means of the standby magazine have a tilt of 45 degrees and that the rotational angle between the delivery position to/from the tool shifter and the delivery position to/from the automatic tool changer is 180 degrees.

In the automatic tool changing apparatus of claim 2, the invention as defined in claim 5 is characterized in that the tool holding means of the standby magazine have a tilt of 45 degrees and that the rotational angle between the delivery position to/from the tool shifter and the delivery position to/from the automatic tool changer is 180 degrees.

In the automatic tool changing apparatus of claim 3, the invention as defined in claim 6 is characterized in that the tool holding means of the standby magazine have a tilt of 45 degrees and that the rotational angle between the delivery position to/from the tool shifter and the delivery position to/from the automatic tool changer is 180 degrees.

According to the present invention, the tool holding means of the standby magazine has a tilt of 45 degrees and the rotational angle is 180 degrees between the delivery position to/from the tool shifter and the delivery position to/from the automatic tool changer, with the result that the directions of the axes of the tools are tilted 90 degrees relative to each other at the two delivery positions.

It is thus possible to change through 90 degrees the direction of the axis of the tool upon the translation by the tool shifter and the direction of the axis of the tool upon the translation by the automatic tool changer, i.e., to orient the axis of the tool stored in the tool magazine to be perpendicular to the axis of the spindle.

In the automatic tool changing apparatus of any one of claims 1 to 6, the invention as defined in claim 7 is characterized in that the tool holding means of the tool magazine and the standby magazine are in the form of recesses which each axially removably receive and hold an axial end of the tool, and that the tool shifter, when translating the tool between the tool magazine and the standby magazine for delivering operation, travels in the axial direction of the tool for insertion or removal of the tool into or from the recess.

According to the above invention, the delivery of the tool to/from the tool holding means can be effected by insertion into or removal from the recess after movement in the axial direction of the tool, thus achieving the simplification of the holding mechanism.

In the automatic tool changing apparatus of any one of claims 1 to 6, the invention as defined in claim 8 is characterized in that the tool holding means of the tool magazine and the standby magazine are in the form of clamps which each radially releasably grip a tool pot having an recess for axially removably receiving and holding an axial end of the tool, and that the tool shifter translates the tool together with the tool pot between the tool magazine and the standby magazine, for delivering operation.

According to the above invention, for the delivery of the tool from the tool magazine to the standby magazine, the tool is transferred together with the tool pot, and the tool pot is shared as the tool holding means by the tool magazine and the standby magazine, thus reducing the absolute number of the tool holding means.

By virtue of use of the clamps radially releasably gripping the tool pot as the tool holding means for holding the tool pot, the fitting or removal of the tool pot is easy.

In the automatic tool changing apparatus of claim 8, the invention as defined in claim 9 is characterized in that one of the tool magazine and the standby magazine is translatable toward the other to function as the tool shifter.

According to the above invention, the tool shifter can be left out to simplify the constitution of the automatic tool changing apparatus.

The present invention will now be described with reference to the accompanying drawings which illustrate embodiments thereof in a non-limitative manner.

[First Embodiment]

Figure 4B:
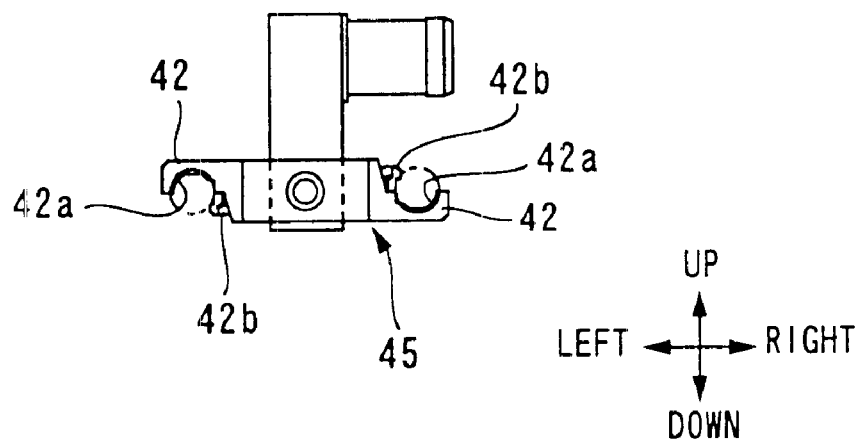
FIG. 4B is the front elevational view of the same.

FIG. 1A shows, in top plan, the major part of an automatic tool changing apparatus in accordance with a first embodiment of the present invention, FIG. 1B is a side elevation of a tool shifter, and FIG. 1C is a front elevation of an ATC. FIG. 2A is a diagram of a standby magazine viewed from line II—II of FIG. 1A, and FIG. 2B is a sectional view of the standby magazine taken along its center. FIGS. 3A and 3B show the tool shifter in top plan and side elevation, respectively. FIGS. 4A and 4B show the ATC in top plan and front elevation, respectively. Other constituent elements such as a column and a table than the automatic tool changing apparatus, a base of the automatic tool changing apparatus, and support frames for supporting sub-assemblies are not shown. The standby magazine is shown mainly in section taken along its center.

Horizontal Machining Center

Referring to FIGS. 1A to 1C, the automatic tool changing apparatus of the first embodiment is applied to a horizontal machining center.

The horizontal machining center comprises a bed firmly secured to the floor surface, a column disposed on top of the bed so as to be slidable right-to-left, i.e., transversely across the bed, and a table disposed on the bed in front of the column in such a manner as to be slidable front-to-back, across the bed. The front of the column is provided with a spindle head which is slidable vertically relative to the column, the spindle head supporting a forward horizontally extending spindle 1 rotatably around its axis. A tool 3 is fitted to the extremity of the spindle 1. The spindle 1 travels front-to-back, up-to-down and right-to-left relative to a workpiece fastened to the table so that the workpiece is cut and ground by the tool 3 turning on the extremity.

The automatic tool changing apparatus is generally designated at 5 and is firmly secured to the bed leftward of the column. This apparatus extracts and delivers a tool depending on the machining step from various types of tools 3 stored in a tool magazine 11 of the apparatus, to change a tool 3 fitted to the spindle 1 for the delivered one, while simultaneously retracting a used tool removed from the spindle 1 back into the tool magazine 11.

Automatic Tool Changing Apparatus

The automatic tool changing apparatus 5 comprises the tool magazine 11, a tool shifter 21 provided laterally of a tool port 11a of the tool magazine 11 to parallel translate the tool 3 (while keeping the direction of the axis of the tool 3) for loading into or unloading from the tool magazine 11, a standby magazine 31 including tool holding means by which the tool 3 loaded or unloaded by the tool shifter 21 is temporarily held for standby, and an automatic tool changer (ATC) 41 arranged to change the tool 3 fitted to the spindle 1 for the tool 3 held by the standby magazine 31, with the above subassemblies being fastened via e.g., support frames to the base of the automatic tool changing apparatus.

Tool Magazine

The tool magazine 11 is a horizontal one having a transversely extended rectangular endless chain 13 which travels around four sprockets 15 positioned at four corners of the magazine, to move in a vertical plane. For the purpose of making the entire machining center compact, the tool magazine 11 is disposed on the left side of the column such that the longitudinal direction of the tool magazine 11 is parallel to the axis of the spindle 1 and that the longitudinal direction of the tool magazine 11 is orthogonal to the longitudinal direction of the table.

A plurality of tool pots 17 are fastened to the endless chain 13 at appropriate intervals along its longitudinal direction, each tool pot 17 having a tapered hole 17a as tool holding means into which a conical holder portion 3a of the tool 3 is fitted for holding the tool 3. To allow the holder portion 3a to be inserted or removed horizontally from the left lateral side, the tapered hole 17a opens to the horizontal direction and leftward, i.e., to the horizontal direction and orthogonally to the longitudinal direction, as a result of which the axis of the tool 3 is also directed to the horizontal direction and orthogonally to the longitudinal direction upon the insertion.

The tool port 11a for loading or unloading the tool 3 into or from the tool magazine 11 is positioned at the corner which is closest to the spindle 1 among the four corners defined by the endless chain 13 and which corresponds to the lower front corner of FIG. 1A. Then, a drive motor 19 rotates the sprocket 15 in forward or reverse direction to travel the endless chain 13 so that a desired tool 3 or tool pot 17 can be indexed at the tool port 11a.

It is to be noted that the tapered hole 17a acting as the tool holding means is provided at its deepest portion 17b with disengagement prevention means for the tool 3 fitted into the tapered hole 17a, the disengagement prevention means serving to prevent the tool from being disengaged leftward unless a pulling force exceeding a certain level is applied thereto. Such disengagement prevention means are comprised of an engagement member urged by, e.g., a spring radially and inwardly of the tapered hole 17a, this engagement member coming into engagement with an annular protuberance circumferentially formed at the axial end of the holder portion 3, to thus function as tool disengagement prevention means.

Standby Magazine

As shown in FIG. 1A, a circular standby magazine 31 for temporary standby of the tool 3 is disposed between the tool magazine 11 and the spindle 1, i.e., rightward in front of the tool magazine 11. The standby magazine 31 as shown in FIGS. 2A and 2B is disposed on an output shaft 33a of a cam motion 33 having an intermittent rotational indexing function. The surface of the standby magazine 31 is formed with four tapered holes 37a as tool holding means similar to the tool pot 17, which are angularly spaced 90 degrees apart on the same circumference around the output shaft 33a so as to be able to hold at most four tools 3. Then, as shown in FIGS. 1A, 1B, 1C and 2A, intermittent indexing rotation of the cam motion 33 causes a rotation of the output shaft 33a by the indexing angle of 90 degrees such that the tool holding means 37a are positioned at a predetermined delivery position 31a to the tool magazine 11 side (delivery position 31a to/from the tool shifter 21 which will be described later) or at a predetermined delivery position 31b to the spindle 1 side (delivery position 31b to/from the automatic tool changer 41 which will be described later).

As seen in FIG. 1A, the axis of the output shaft 33a as the rotational shaft points to the direction bisecting the contained angle between the direction of the axis of the tool 3 upon the retraction into the tool magazine 11 and the direction of the axis of the tool 3 upon the mounting on the spindle 1, and in this embodiment, it points to horizontally and forwardly diagonally 45 degrees leftward direction.

As is apparent from FIGS. 1A and 2B, the axis of the tapered hole 37a is formed at the angle, i.e., 45 degrees halving the above contained angle relative to the axis of the output shaft 33a, with the four tools 3 being radially held with 45-degree tilt with respect to the output shaft. Then, the delivery position 31a to the tool magazine 11 side is set to the position of nine o'clock on the clock dial where the axis of the tool 3 is horizontal, whereas the delivery position 31b to the spindle 1 side is set to the position of three o'clock which is 180-degree rotational angle apart from the nine o'clock. In consequence, between the two positions, the direction of the axis of the tool 3 varies from horizontally leftward to horizontally forward with 90-degree tilt. For this reason, in the standby magazine 31, the tool 3 can be held such that, at the delivery position 31a to the tool magazine 11 side, its axis is parallel to the axis in the tool magazine and that, at the delivery position 31b to the spindle 1 side, its axis is parallel to the axis of the spindle 1.

Thus, even though the axis of the tool 3 varies through 90 degrees in direction between the tool magazine 11 and the spindle 1, the direction of the axis can be varied in the process of indexing of the standby magazine 31 without using any tilting apparatus for varying the direction of the tool 3.

The cam motion 33 causing the output shaft 33a to undergo intermittent indexing rotation can be various known ones, but preferably a backlash-preventive one having a high indexing precision and high indexing speed. For example, a cam motion using a globoidal cam is preferred. This cam motion comprises an input shaft supported by the housing, a globoidal cam secured coaxially to the input shaft, and an output shaft which is rotated by way of a turret engaging with a tapered rib formed on the periphery of the globoidal cam, such that the uniform velocity rotation of the input shaft by a drive motor 39 coupled thereto causes intermittent indexing rotations of the output shaft.

Tool Shifter

As shown in FIGS. 1A and 1B, the tool shifter 21 is provided between the tool port 11a of the tool magazine 11 and the delivery position 31a to the tool magazine 11 side of the standby magazine 31, the tool shifter 21 being suspended to the support frame firmly secured to the base. The tool shifter 21 oscillates front-to-back on a support point 21a above so as to approach the anterior delivery position 31a or the posterior tool port 11a, for loading and unloading of the tool 3, and transfers the extracted tool 3 therebetween. The constitution of the tool shifter 21 is described in detail in Japan Patent Application No. 2000-194215 filed by the present applicant, and hence description herein will be simplified to an extent required for understanding of the invention of the present application.

The tool shifter 21 as shown in FIGS. 3A and 3B comprises a cam motion 23 as the tool shifter body supported oscillatorily front-to-back on the support point 21a, a drive motor 25 rotating at the uniform velocity coupled to an input shaft of the cam motion 23, an U-shaped griping arm 27 firmly secured to a first output shaft 21b of the cam motion 23, and a link member 24 for coupling a second output shaft 21c of the cam motion 23 to the support frame.

The uniform velocity rotation of the input shaft causes an oscillatory rotation of the second output shaft 21c which in turn is transmitted via the link member 24 to the support frame for front-to-back oscillatory rotation of the cam motion itself, i.e., the tool shifter body 23. Then, an advance limit 23a of this oscillatory rotation is the delivery position to/from the standby magazine 31 in the tool shifter 21, an retreat limit 23b is the delivery position to/from the tool magazine 11, and the intermediate is a standby point 23c, with the oscillatory angles in the forward direction and the backward direction are set to the same angle so that the two delivery positions are level with each other.

The first output shaft 21b fitted firmly with the gripping arm 27 is provided facing leftward and, when the input shaft receives the uniform velocity rotations, makes intermittent indexing rotations around its axis and extending/contracting actions in its axial direction at a predetermined timing. This indexing direction is set at the two delivery positions so that the U-shaped gripping arm 27 firmly secured to the shaft faces the direction of the delivery positions at a predetermined timing and travels transversely right-to-left at a predetermined timing. In the contracted state (indicated by the solid line) of the first output shaft 21b, the lateral position of the U-shaped gripping arm 27 conforms to the annular engagement groove 3c of the tool 3 indexed at the tool port 11a and to the annular engagement groove 3c of the tool 3 at the delivery position 31a to/from the tool shifter 21 in the standby magazine 31. Then, at the advance limit 23a and the retreat limit 23b of the oscillatory rotation of the tool shifter body 23, the opening of the U-shaped gripping arm 27 facing the direction of the delivery positions engagingly receives the annular engagement groove 3c of the tool 3 at the tool port 11a and the annular engagement groove 3c of the tool 3 at the delivery position 31a to/from the tool shifter 21 in the standby magazine 31, so as to be able to grip the tool 3. On the contrary, in the extended state indicated by the dashed double-dotted line, the U-shaped gripping arm 27 travels leftward to thereby extract the tool 3 from the tool pot 17 and the standby magazine 31.

The delivery of the tool by the tool shifter 21 between the tool magazine and the standby magazine is carried out as follows.

Ordinarily, the tool shifter 23 stands by at the standby position 23c with the first output shaft 21b contracted. When the tool 3 is indexed at the tool port 11a of the tool magazine, the gripping arm 27 points toward the tool port 11a and the tool shifter body 23 rotates to travel to the retreat limit 23b so that the annular engagement groove 3c at the periphery of the tool 3 is engagingly fitted into the opening of the U-shaped portion of the gripping arm 27 to grip the tool 3. Then, in this gripped state, the extending action of the first output shaft 21b allows the arm 27 to extract the tool 3 leftward from the tool pot 17. In this state, the tool shifter 23 rotates to travel to the advance limit 23a. During this travel, the gripping arm 27 points toward the delivery position of the standby magazine 31. Then, in the process of contraction of the first output shaft 21b at the advance limit 23a, the holder portion 3a of the tool 3 gripped by the gripping arm 27 is fitted into the tapered hole 37a of the standby magazine 31 located rightward of the tool 3 to deliver the tool 3 to the standby magazine 31. Then, the tool shifter body 23 rotates to travel to the standby position 23c. During this travel, the annular engagement groove 3c is disengaged from the gripping arm 27, allowing the tool shifter 21 to stop at the standby position 23c to stand by there till the acceptance of the next delivery command.

It will be obvious that the delivery of the tool 3 of the standby magazine 31 to the tool magazine 11 can be effected by reversing the above procedure, and hence the description thereof will be omitted.

Automatic Tool Exchanger (ATC)

As shown in FIGS. 4A and 4B, the ATC 41 is arranged between the standby magazine 31 and the spindle 1. The ATC 41 is an apparatus having an arm 45 provided with two tool gripping portions 42 by means of which the tool 3 held at the delivery position 31b to/from the ATC 41 in the standby magazine 31 is replaced with the tool 3 fitted to the extremity of the spindle 1, for tool change.

Although the spindle 1 is usually located at its rightward machining position to machine the workpiece, upon the tool change the spindle 1 travels from the machining position 1a to the leftward tool change position 1b as a result of sliding movement of the column fitted with the spindle 1. Then, the tool change position 1b lies rightward of the delivery position 31b with their coincident front-to-back positions and up-to-down positions, so that the tool 3 at the tool change position 1b and the tool 3 at the delivery position 31b are coincident in position in the front-to-back direction and up-to-down direction.

The ATC 41 is arranged intermediate between the tool change position 1b and the delivery position 31b in such a positional relationship. The ATC 41 comprises a cam motion 43 fastened via the support frame to the base, the arm 45 fitted to the extremity of an output shaft 43a of the cam motion 43 and having the two tool gripping portions 42 symmetrically with respect to the output shaft 43a, and a drive motor 49 rotating at a uniform velocity coupled to an input shaft of the cam motion 43.

The output shaft 43a of the cam motion 43 extends parallel to the spindle 1, i.e., extends horizontally forwardly, with its axis lying at the midpoint between the tool change position 1b and the delivery position 31b. When the input shaft of the cam motion 43 rotates at the uniform velocity, the output shaft 43a is extended or contracted in the front-to-back direction at a predetermined timing and makes intermittent indexing rotations around its axis at a predetermined timing, which is followed by the same action of the arm 45 firmly secured to the output shaft 43a.

The tool gripping portion 42 of the arm 45 comprises a semicircular grip portion 42a having an opening formed in its rotational direction with which opening the annular engagement groove 3c of the tool 3 engages, and a gripping claw 42b disposed at the extremity of the grip portion 42a and urged in the direction where the opening is closed. When the arm 45 rotates around the output shaft 43a, the annular engagement groove 3c of the tool 3 is fitted into the opening of the gripping portion 42 so that the tool 3 is firmly clamped between the semicircular grip portion 42a and the gripping claw 42b. Once a predetermined force is applied pulling the tool 3 in the direction of the opening, the gripping claw 42b retracts against the urging force, with the result that the opening become larger to release the tool 3 from the semicircular grip portion 42a.

With the output shaft 43a contracted as indicated by the dashed double-dotted line in the diagram, the front-to-back position of the tool gripping portion 42 of the arm 45 coincides with the position of the annular engagement groove 3c of the tool 3 held in the standby magazine 31 and with the position of the annular engagement groove 3c of the tool 3 fitted to the spindle 1. When the arm 45 becomes horizontal as a result of rotation of the output shaft 43a, the gripping portion 43 comes into engagement with the two annular engagement grooves 3c to grip the two tools 3, and from this state, the output shaft 43a is extended as indicated by the solid line in the diagram so that the two tools 3 are extracted out of the standby magazine 31 and the spindle 1.

The tool change between the standby magazine 31 and the spindle 1 by such an ATC 41 is carried out as follows.

Ordinarily, at the delivery position 31b to/from the ATC 41, the standby magazine 31 indexes a tool 3 to next be used whilst the arm 45 stands by contracted in its axial direction with its longitudinal direction pointed to the plumb line. Then, the tool change starts upon the termination of a predetermined machining step, and when the spindle 1 travels from the machining position 1a to the tool change position 1b as a result of sliding movement of the column, the arm 45 rotates for horizontal indexing to grip the two tools 3 by the gripping portion 42. With axial extension to extract the two tools 3 out of the standby magazine 31 and the spindle 1 as indicated by the solid line in the diagram, 180-degree indexing rotation is effected from that position. Then, with axial contraction as indicated by the dashed double-dotted line in the diagram, the two tools 3 are fitted into the standby magazine 31 and the spindle 1 for loading. To effect the next machining step, the column travels to the rightward machining position 1a while simultaneously the arm 45 rotates through 90 degrees in the opposite direction to the above rotational direction to point the vertical direction and stands by intactly till the next tool change.

Although the cam motion 43 can be any one as long as its output shaft 43a is axially extended or contracted with intermittent indexing rotation, a cam motion is preferred which uses a globoidal cam as disclosed in, e.g., Japan Utility Model Laid-open Pub. No. Sho60-31545. This cam motion is capable of improving the indexing precision and indexing speed with the backlash eliminated, and of converting the uniform velocity rotational motion into the output shaft intermittent rotational motion and axial reciprocative linear motion, for output to the output shaft, thus simplifying the apparatus constitution.

Tool Change Operations

Reference is made to FIGS. 1A and 1B to describe the tool change operations throughout the automatic tool changing apparatus 5. The automatic tool changing apparatus 5 is under the control of a controller which commands the tool change operations. The controller sends out control signals to the drive motors 19, 29, 39 and 49. This controller is interlinked for gang control with another controller which provides a control of other units such as the table and column of the machining center.

The tool 3 stored in the tool magazine 11 is indexed at the tool port 11a by means of the endless chain 13. This tool 3 is then gripped by the tool shifter 21 for extraction from the tool pot 17, and transferred to the standby magazine 31 where the tool 3 is inserted and held into the tool holding means 37a indexed at the delivery position 31a.

Through its indexing rotation, the standby magazine 31 allows the tool 3 to next be used among the four tools 3 held by the standby magazine 31 to be set to the delivery position 31b.

When the controller issues a command for change of the tool 3 fitted to the spindle 1 after termination of a predetermined machining step of the workpiece, the column travels from the machining position 1a to the tool change position 1b. Then, the ATC 41 replaces the tool 3 to next be used at the delivery position 31b with the used tool 3 of the spindle 1. Immediately after this replacement of the tools 3, the column returns to the machining position 1a to start a scheduled machining step without depending on the operations of the automatic tool changing apparatus 5.

The progress of this machining step is grasped in detail by the controller. Previous to the change of the tool 3 fitted to the spindle 1, the tool 3 to next be used is in advance indexed and stands by at the delivery position 31b to/from the ATC 41 in the standby magazine 31.

During a machining step requiring a long period of time, the used tool 3 held in the standby magazine 31 is transferred to the tool magazine 11 for storage therein, and the tool 3 to be used is stored in vacant tool holding means 37a of the standby magazine 31. More specifically, in the standby magazine 31 the used tool 3 is indexed at the delivery position 31a to/from the tool magazine 11, whilst in the tool magazine the tool pot 17 corresponding to the used tool 3 is indexed at the tool port 11a by the operation of the endless chain 13 so that the used tool 3 is delivered by the tool shifter 21 from the delivery position 31a to the tool port 11a. Due to the operation of the endless chain 13, the tool 3 to thereafter be used is indexed at the tool port 11a and delivered by the tool shifter 21 to vacant tool holding means 37a of the standby magazine 31.

It is to be understood that the tools 3 having a high frequency of use are grasped e.g., by manual entry into storage means included in the controller or by learning from the previous results of use, so that once used tools are intactly held in predetermined tool holding means 37a of the standby magazine 31 without return to the tool magazine 11.

This automatic tool changing apparatus employs three motor-driven cam mechanisms to effect the above tool change operations without use of hydraulic pump as the drive source. For this reason, there is obtained an oil-splash-free, environment-orientated automatic tool changing apparatus capable of reducing the standby power of the hydraulic pump and other power to achieve the energy saving.

Second Embodiment

FIGS. 5A and 5B show in front elevation and side elevation, respectively, the major part of an automatic tool changing apparatus in accordance with a second embodiment of the present invention. The constituent elements such as the column and the table other than the automatic tool changing apparatus, the base of the automatic tool changing apparatus, and the support frames for supporting sub-assemblies are not visible.

Upright Machining Center

The automatic tool changing apparatus of the second embodiment is generally designated at 51 and is applied to an upright machining center. The constitution thereof is substantially the same as that of the first embodiment, and hence the identical reference numerals are imparted to the same elements or members to hereinbelow describe only the difference therebetween.

The upright machining center comprises a bed firmly secured to the floor surface, a column disposed on top of the bed so as to be slidable right-to-left, i.e., transversely across the bed, and a table disposed on the bed in front of the column in such a manner as to be slidable front-to-back across the bed. The front of the column is provided with a spindle head which is slidable up-to-down, i.e., vertically relative to the column, the spindle head supporting the spindle 1 extending vertically downward from the bottom of the spindle head, so as to be rotatable around the axis of the spindle 1. The tool 3 is fitted to the extremity of the spindle 1.

The automatic tool changing apparatus 51 is firmly secured to the bed rightward of the column.

The automatic tool changing apparatus 51 comprises the tool magazine 11, the tool shifter 21, the standby magazine 31 and the ATC 41 similarly to the first embodiment, with a slightly different arrangement thereof due to the vertically downwardly facing spindle 1.

The tool magazine 11 of the same type as the first embodiment is arranged rightward of the column and the tools 3 are held facing horizontally rightward by the tool pot 17 fastened to the endless chain 13 of the tool magazine 11. The tool shifter 21 is arranged leftward below the tool port 11a positioned at the lower front corner, of the four corners of the endless chain 13. Below the tool shifter 21 is arranged the standby magazine 31.

In order that the tool can be transferred with the tool axis facing horizontally rightward between the tool port 11a of the tool magazine 11 positioned above the tool shifter 21 and the delivery position 31c to the tool magazine side in the standby magazine 31 positioned below the tool shifter 21, the tool shifter 21 comprise the tool shifter body 23 which is supported vertically oscillatorily by the rear support 21a.

In order that the direction of the tool axis can be varied from horizontally rightward to the vertically downward parallel to the direction of the axis of the spindle 1 in the process of indexing the tool 3 through 180 degrees from the delivery position to the tool shifter 21 to the delivery position 31d to/from the ATC 41, the standby magazine 31 positioned below the tool shifter 21 comprises the cam motion 33 having the output shaft 33a which points to leftward diagonally 45-degree downward, and the tool holding means 37a tilted 45 degrees relative to the rotational axis.

The ATC 41 is disposed leftward below the standby magazine 31. Upon the tool change, the column slides rightward from the machining position 1c to the tool change position 1d. At the same time, the height of the spindle 1 is adjusted so that the leftward tool 3 at the delivery position 31d to/from the ATC 41 in the standby magazine 31 is level with the tool 3 fitted to the spindle 1.

Then, the output shaft 43a of the ATC 41 lies on the midpoint between the tool change position 1d and the delivery position 31d, with the arm 45 being firmly secured to the extremity of the vertically upward facing output shaft 43a so that the tool change is effected between the spindle 1 and the standby magazine 31 by means of the arm 45.

Figure 6B:
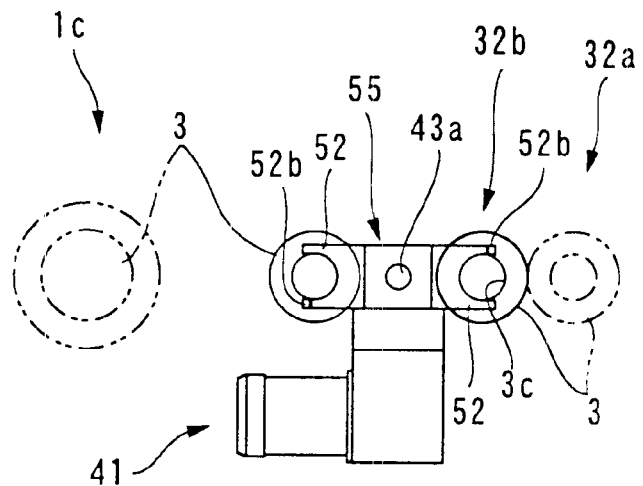
FIGS. 6A, 6B and 6C illustrate a variant of an ATC applied to the second embodiment, in front elevation, top plan, and side elevation, respectively.
Figure 6A:
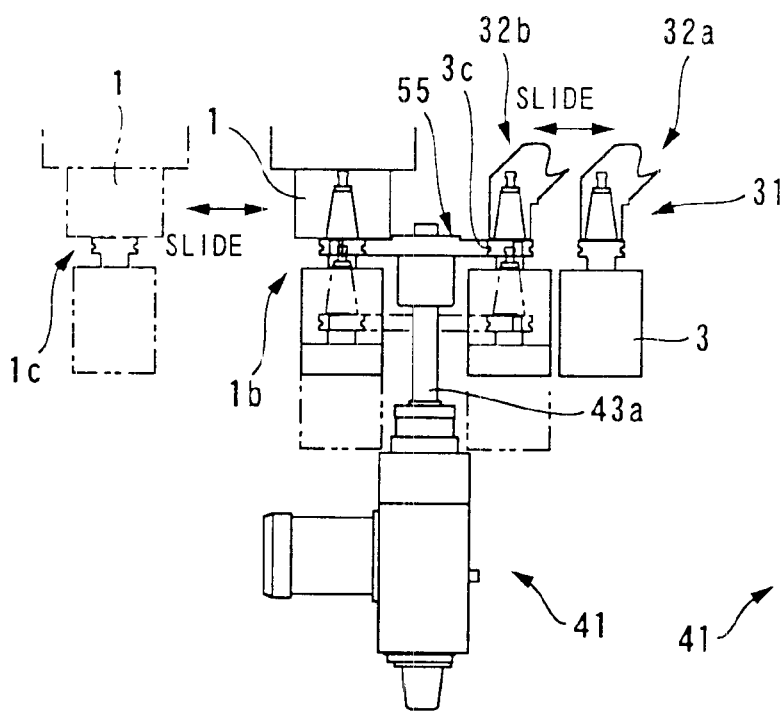
Figure 6C:
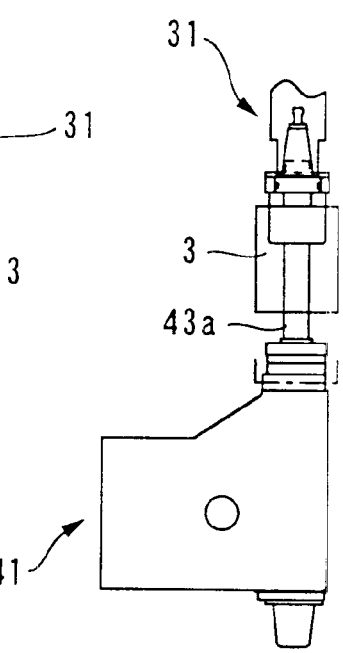

FIGS. 6A to 6C depict a variant of the ATC applied to the upright machining center.

As shown, an arm 55 of this variant comprises a U-shaped gripping portion 52 engaging the annular engagement groove 3c formed in the periphery of the tool 3, with an opening of the U-shaped gripping portion 52 facing the radial direction of the output shaft 43a so as to allow the tool 3 to be inserted or removed only in the radial direction.

The U-shaped gripping portion 52 has at its extremity a protrusive gripping claw 52b which is urged by, e.g., a spring to the direction closing the opening, the gripping claw 52b serving as disengagement prevention means for the engaged tool 3 to ensure that the tool 3 is prevented from being disengaged radially outwardly unless a predetermined puling force acts on the tool 3.

On the other hand, the standby magazine 31 is supported via a linear guide by the support frame firmly secured to the base and is slidable horizontally right-to-left, with its rightward stroke limit being the standby position 32a for delivery of the tool 3 to/from the tool shifter, and with its leftward stroke limit being the tool change position 32b for delivery of the tool 3 to/from the ATC 41. Ordinarily, the standby magazine 31 stands by at the standby position 32a to store the tool to be used from the tool shifter and deliver the used tool to the tool shifter.

Then, upon the tool change, the spindle 1 and the standby magazine 31 travel to their respective tool change positions 1d and 32b to approach the ATC 4, and as indicated by the solid line in the diagram, the tool fits into the opening of the U-shaped gripping portion 52 of the arm 55 so that the tool 3 is held as a result of engagement of the annular engagement groove 3c of the tool with the U-shaped gripping portion 52. Then, as indicated by the dashed double-dotted line in the diagram, the contacted output shaft 43a causes the arm 55 to travel downward to extract the two tools 3 from the spindle 1 and the standby magazine 31, after which the arm 55 is inversely rotated through 180 degrees around the axis to replace the two tools 3 with each other. Then, as indicated by the solid line in the diagram, the extended output arm 43a causes the arm 55 to travel upward to fit the tools to the spindle 1 and the standby magazine 43a. Then, the spindle 1 and the standby magazine 31 slide transversely and return to the machining position 1c and the standby position 32a, respectively, to disengage the tool 3 from the opening of the holding portion 52. The tool change is thus achieved.

Third Embodiment

Figure 8C:
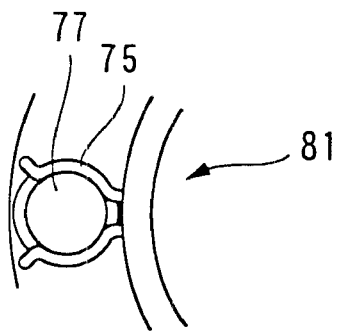
FIGS. 8A, 8B and 8C are diagrams of a standby magazine viewed from line VIII—VIII of FIG. 7A, from line B—B of FIG. 8A, and from line C—C of FIG. 8B, respectively.
Figure 8B:
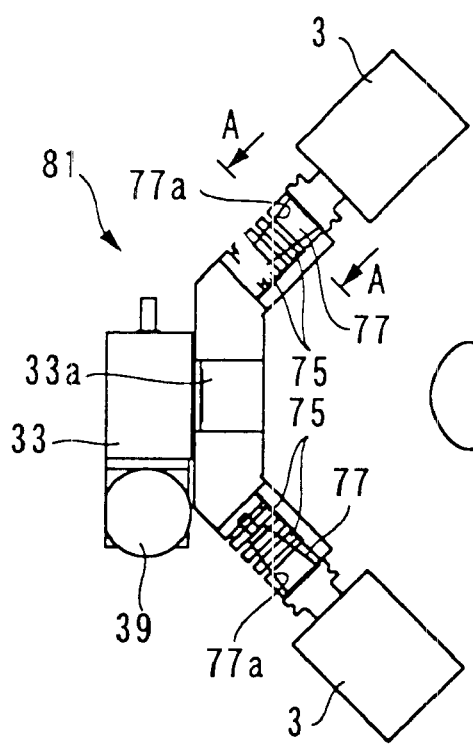
Figure 8A:
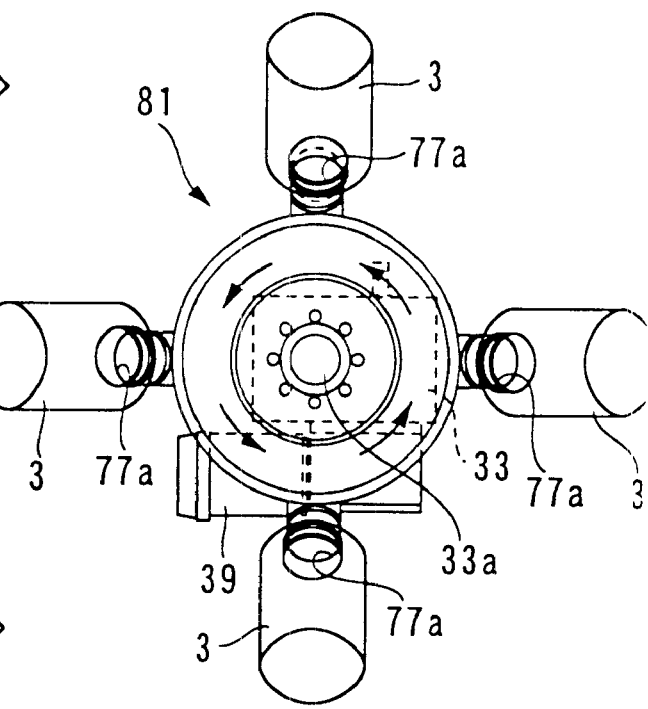
Figure 9:
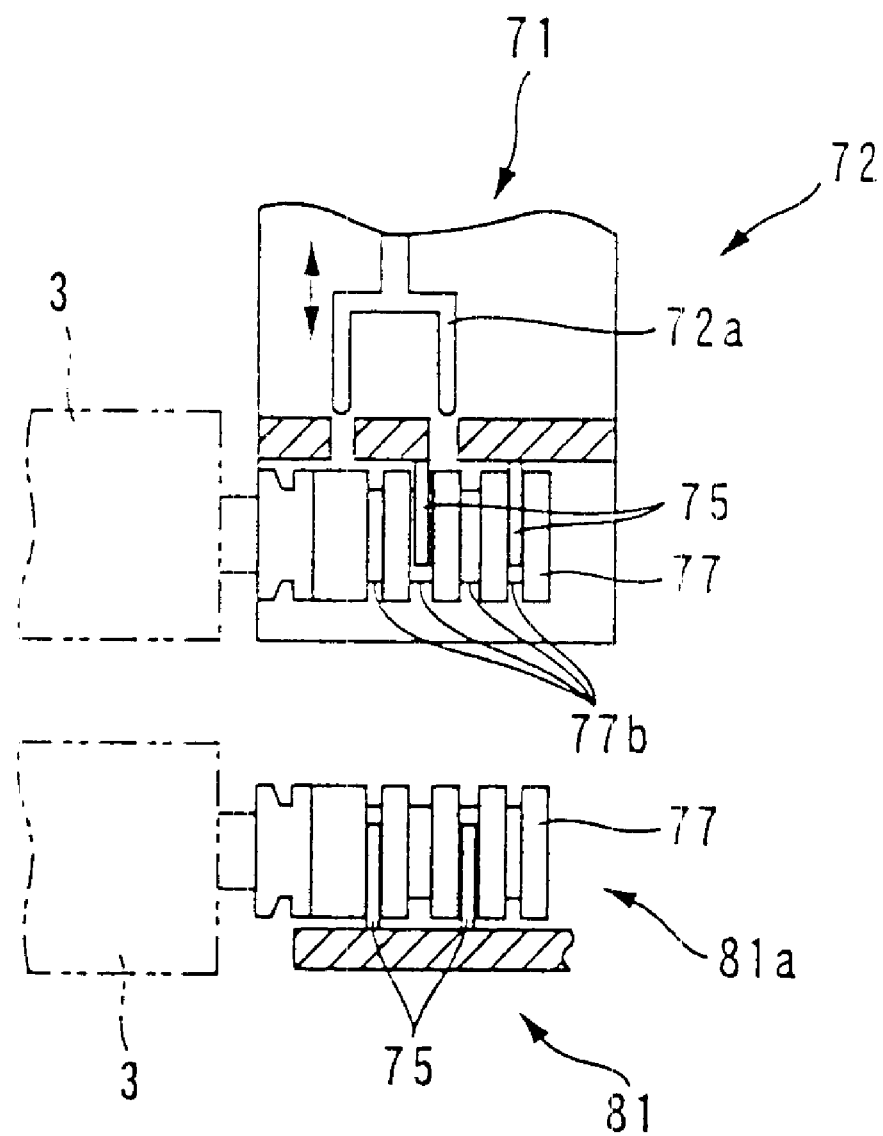
FIG. 9 is a sectional side elevation taken along line IX—IX of FIG. 7B.

FIGS. 7A and 7B depict the major part of an automatic tool changing apparatus in accordance with a third embodiment of the present invention, FIG. 7A being a front elevational view thereof and FIG. 7B being a side elevational view of the tool magazine with the tool removed. FIGS. 8A to 8C are diagrams of the standby magazine viewed from line VIII—VIII of FIG. 7A, viewed from line B—B of FIG. 8A, and viewed from line C—C of FIG. 8B. FIG. 9 is a sectional side elevation taken along line IX—IX of FIG. 7B.

Referring to FIG. 7A, the automatic tool changing apparatus of the third embodiment is generally designated at 61 and is applied to the horizontal machining center. Throughout several views of the drawings, the identical reference numerals are imparted to the same members or elements as those of the first embodiment.

The automatic tool changing apparatus 61 of the third embodiment differs from the first embodiment in that the tool 3 is transferred together with a tool pot 77 from a tool magazine 71 to a standby magazine 81, i.e., the tool pot 77 is transferred therebetween. This difference allows the automatic tool changing apparatus 61 to have a different constitution. The automatic tool changing apparatus 61 comprises the circular tool magazine 71, the standby magazine 81 which slides toward the tool magazine 71 for delivery of the tool 3, and the ATC 41 which is the same as that of the first embodiment, without provision of the tool shifter 21.

Tool Magazine

An output shaft 73a of a cam motion not shown is fastened to the center of the circular tool magazine 71 so that the cam motion causes the intermittent indexing rotations of the tool magazine 71. This cam motion is similar in the major constitution to the cam motion used in the standby magazine, but different in only the indexing angle therefrom. For driving, the cam motion accepts uniform velocity rotations from a drive motor coupled to an input shaft of the cam motion.

The periphery of the tool magazine 71 is formed with 16 radially extending clamps 75 which are spaced circumferentially equidistantly apart from each other for gripping at most 16 tool pots 77 so that the tool pots 77 can be held with the axes of the tools being parallel to the output shaft 73a. The clamps 75 are C-shaped and provided in pairs in the axial direction. The opening of the clamp 75 faces radially outward to engage with two of four annular engagement grooves 77b formed at the periphery of the tool pot 77 as shown in FIG. 9, so as to clam the peripheral surface of the groove bottom to hold the tool pot 77. Then, the tool pots 77 are relatively displaced radially inwardly or outwardly so that the tool pots 77 can be inserted into or removed from the clamps 75 through the openings.

Such a tool magazine 71 is arranged laterally of the column such that the output shaft 73a points to horizontally lateral side. A tapered hole 77a of the tool pot 77 also faces leftward similarly to the first embodiment, as a result of which the tool 3 is also held in this direction.

A tool port 71a of the tool magazine 71 is defined at the most forward position so that the intermittent indexing rotations of the cam motion causes forward or reverse rotations of the tool magazine 71 to allow the tool pot 77 storing a desired tool 3 to be indexed at the tool port 71a.

At this tool port 71a, as shown in FIG. 9, there is provided a pusher assembly 72 having a push member 72a which immerges in the radial direction of the tool magazine 71, in order to urge the tool pot 77 indexed at the tool port 71a radially outwardly upon the delivery of the tool pot 77 to the standby magazine 81 to release the tool pot 77 from the clamp 75.

Standby Magazine

As seen in FIG. 7A, the standby magazine 81 is disposed between the tool magazine 71 and the spindle 1, i.e., rightward forward of the tool magazine 71 in the same manner as the first embodiment, with a delivery position 81a to/from the tool magazine 71 in the standby magazine 81 lying immediately anterior to the tool port 71a. As shown in FIGS. 8A and 8B, this standby magazine 81 has substantially the same structure as the first embodiment except that the tapered hole of the first embodiment is substituted by the clamp 75 so as to ensure the delivery of the tool 3 with the tool pot 77 to/from the tool magazine 71. As shown in FIG. 9, the clamps 75 serve to clamp and hold remaining two of the four annular engagement grooves 77b formed at the periphery of the tool pot 77 and are provided in pairs in the axial direction of the tool pot. As is apparent from FIGS. 7A, 8A and 8B, the direction of the output shaft 33a of the standby magazine 81 and the direction of the tool axis upon the holding of the tool 3 are substantially the same as the first embodiment and hence will not again be described.

A linear guide not shown is interposed between the cam motion 33 of the standby magazine 81 and the support frame fastened to the base, to guide the standby magazine 81 horizontally movably front-to-back toward the tool magazine 71 as shown in FIGS. 7A and 7B. At the advance limit of this stroke is carried out the delivery of the tool 3 to/from the ATC 41 which will be described later, and at the retreat limit is carried out the delivery of the tool to/from the tool magazine 71. Then, at this retreat limit, the center of the clamp 75 at the delivery position 81a of the standby magazine 81 is coincident with the center of the clamp 75 at the tool port 11a so that the tool pot 77 is clamped by the two clamps 75.

The gripping force of the clamp 75 of the standby magazine 81 is set to a value smaller than that of the tool magazine 71. For this reason, although the tool pot is pulled by the two clamps 75 in the process of travelling to the advance limit after having been gripped by the two clamps 75 at the retreat limit, the engagement with the clamp 75 of the standby magazine 81 is released, allowing the tool pot 77 to be gripped by the clamp 75 of the tool magazine 71.

Thus, in case of delivering the tool pot 77 from the standby magazine 81 to the tool magazine 71, travel to the advance limit after having been gripped by the two clamps 75 as a result of travel to the retreat limit would allow the delivery to the tool magazine 71 since the tool pot is gripped by the clamp 75 of the tool magazine 71 which surpasses the clamp 75 of the standby magazine 81 in gripping forth. On the contrary, in case of delivering the tool pot 77 from the tool magazine 71 to the standby magazine 81, when turning from the retreat limit to the advance limit, the tool pot 77 is urged toward the standby magazine 81 by the push member 72a of the pusher assembly 72 provided on the tool magazine 71 so that the tool pot 77 is gripped by the clamp 75 of the standby magazine to achieve the delivery to the standby magazine 81.

The drive source for the push member 72a can be an electromotive cylinder or other various drive sources. Naturally, the push member 72a is driven in synchronism with the horizontal travel of the standby magazine 81 in response to a control signal from the controller.

In the third embodiment the standby magazine 81 has been movable, but instead the tool magazine 71 may be movable through the guide of the linear guide for example. Furthermore, in the third embodiment the pusher assembly 72 has been provided to effect the delivery, but instead the clamp of either the tool magazine 71 or the standby magazine 81 may have a variably adjustable gripping force to achieve the delivery operation. For instance, the clamp of the tool magazine 71 may be in the form of an electrically operable arm whose gripping force is variably adjustable, whereby upon the delivery of the tool pot 77 to the tool magazine 71, the gripping force of the arm may be to a value smaller than the gripping force of the clamp of the standby magazine 81, whereas upon the delivery to the standby magazine 81, the gripping force of the arm may be set to a value larger than the gripping force of the clamp of the standby magazine 81.

ATC

As is apparent from FIGS. 7A and 7B, the ATC 41 of the third embodiment is substantially the same as the ATC 41 of the first embodiment, with a slight difference therebetween that in the first embodiment the tool 3 is fitted into or removed from the tapered hole 37a acting as tool holding means formed in the standby magazine, but in the third embodiment the tool 3 is fitted into or removed from the tapered hole 77a formed in the tool pot 77. Hence, description thereof will be omitted.

Variant of Third Embodiment

FIGS. 10A to 10C depict a variant of the third embodiment where the automatic tool changing apparatus of the third embodiment is applied to the upright machining center. Description thereof will however be left out.

Although the embodiments of the present invention has hereinabove been described, the present invention is not limited to the above embodiments but could variously be modified as follows without departing from its spirit and scope.

Figure 11A:
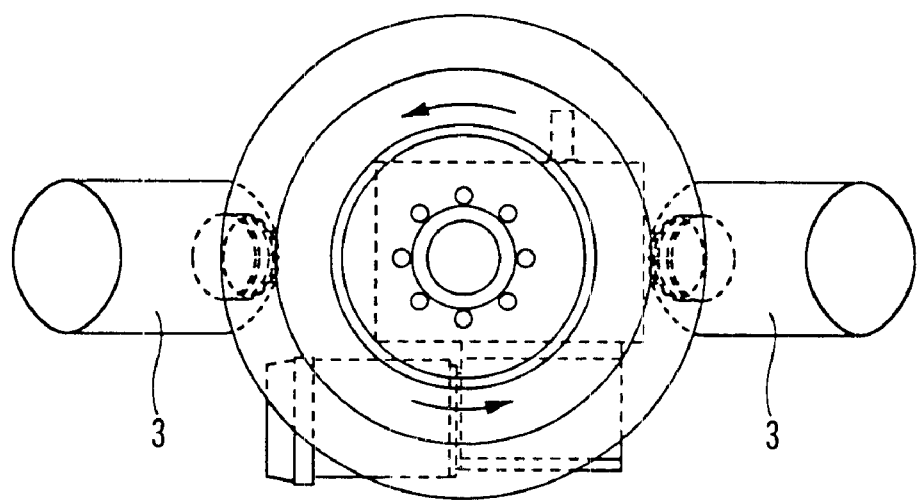
FIGS. 11A and 11B illustrate a variant of the standby magazine of the first embodiment.
Figure 11B:
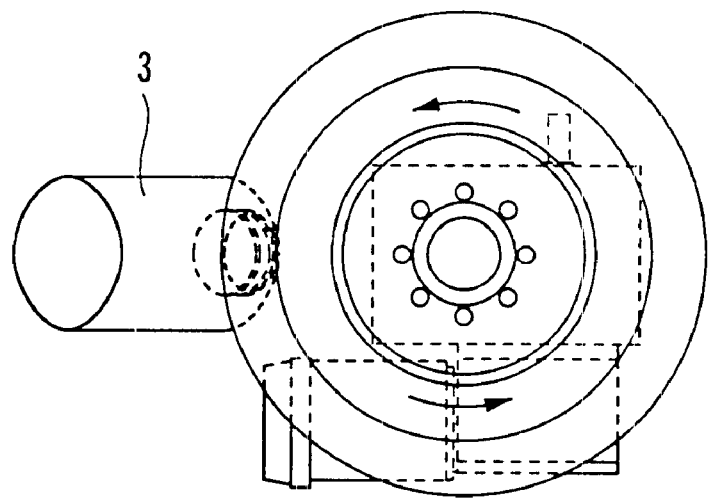

(a) The standby magazine 31 of the first embodiment has been provided with four tool holding means 37a which are spaced 90 degrees apart around the output shaft to hold four tools with 90-degree indexing angle, but without being limited thereto, it may properly be modified depending on the requirements. For instance, as shown in FIGS. 11A and 11B, two tool holding means may be provided with 180-degree angular spacing around the output shaft to hold two tools with 180-degree indexing angle. Alternatively, single tool holding means may be provided to hold a single tool with 180-degree indexing angle.

Figure 12:
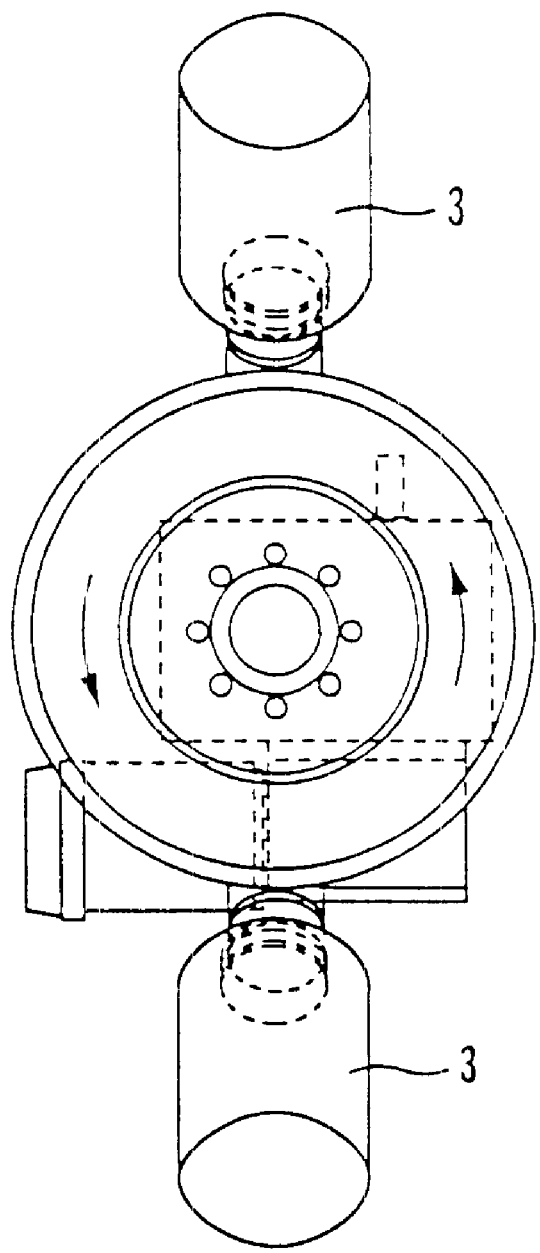
FIG. 12 illustrates a variant of the standby magazine of the third embodiment.
Figure 13:
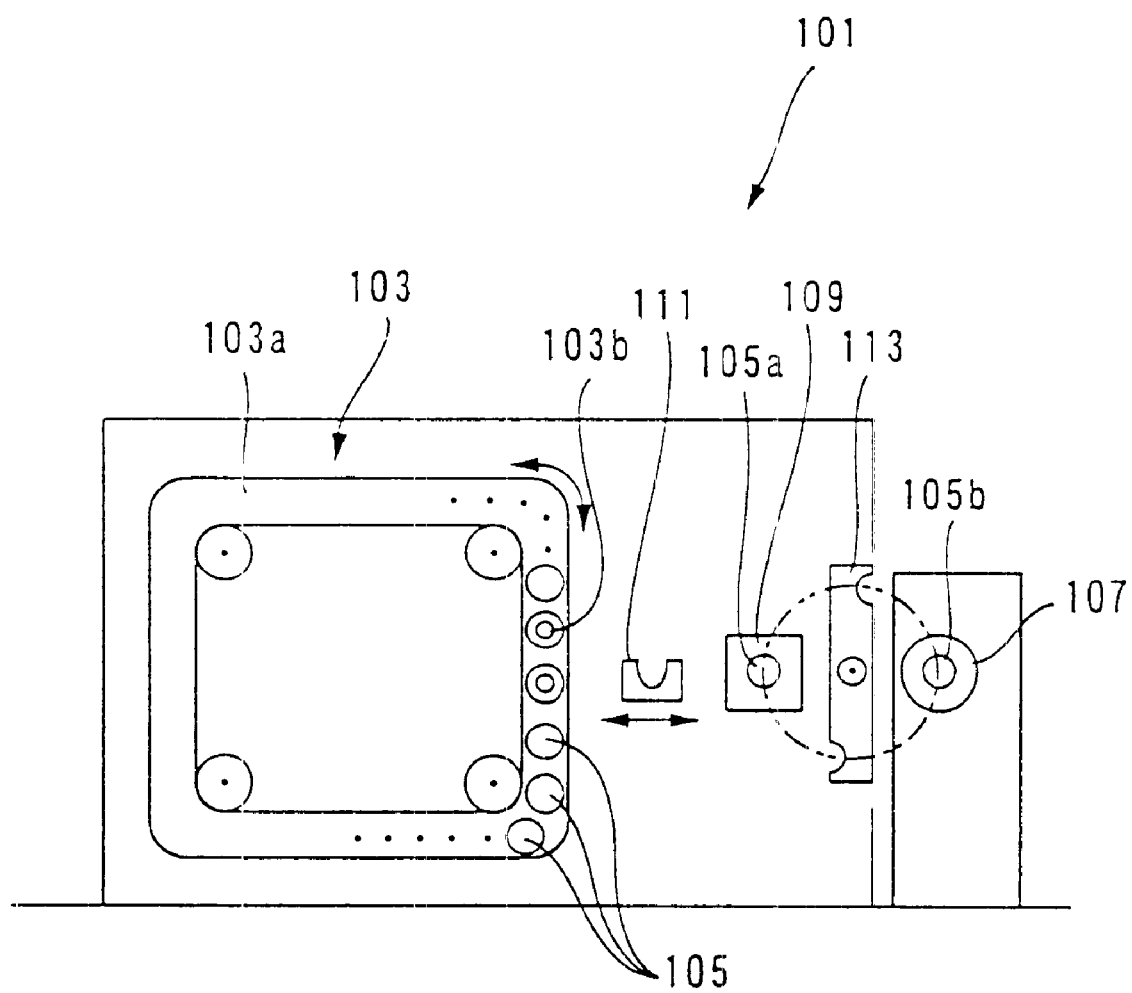
FIG. 13 is a front elevational view showing a conventional automatic tool changing apparatus.

The standby magazine 81 of the third embodiment has been provided with four clamps which are spaced 90 degrees apart around the output shaft to hold four tool ports with 90-degree indexing angle, but without being limited thereto, it may appropriately be modified depending on the requirements. For instance, as shown in FIG. 12, two clamps may be provided with 180-degree angular spacing around the output shaft to hold two tools with 180-degree indexing angle.

(b) In the third embodiment, the tool pots have been transferable from the tool magazine to the standby magazine without using the tool shifter, but the transfer may be effected by use of the tool shifter. In such an event, the standby magazine is securely fixed to the support frame as in the first embodiment. The periphery of the tool pot is formed with three annular engagement grooves, two of which is used for clamp gripping, with the remainder used for tool shifter gripping.

As set forth hereinabove, according to the invention as defined in claim 1, the productivity of the machining center can remarkably be improved without causing any wait for the delivery of the tool even in the case of successive brief machining steps.

By virtue of the constant storage of frequently used tools into the standby magazine, there can be reduced the energy consumption by the apparatus which may occur upon the tool transfer.

Moreover, in the process of indexing the tool in the standby magazine, the direction of the tool can be changed. For this reason, even though the direction of the axis of the tool held by the tool magazine is different from the direction of the axis of the tool fitted to the spindle, there is no need for a separate direction changer for changing the direction of the tool axis, thus contributing to a simplified constitution of the automatic tool changing apparatus, leading to an inexpensive apparatus.

The invention as defined in claim 2 or 3 enables any tool holding means of the standby magazine to hold any tool irrespective of the size of the tool head.

The invention as defined in claims 4 to 6 enables the axis of the tool stored in the tool magazine to be perpendicular to the axis of the spindle so that the tool magazine can be disposed laterally of the machine relative to the spindle to achieve the compactness of the entire machining center.

The invention as defined in claim 7 enables the tool holding mechanism of the tool holding means to be simplified to make the automatic tool changing apparatus inexpensive.

The invention as defined in claim 8 enables the absolute number of the tool holding means to be reduced so that the automatic tool changing apparatus can have a less number of constituent elements and therefore less production costs.

The invention as defined in claim 9 enables the automatic tool changing apparatus to have a simplified constitution with the tool shifter excluded to thereby realize an inexpensive apparatus.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. An automatic tool changing apparatus comprising:
 a tool magazine which stores a multiplicity of tools each held by tool holding means, said tool magazine having a tool port through which said tools are loaded into or unloaded from said tool magazine;
 a tool shifter which is provided laterally of said tool port, said tool shifter translating said tools for loading into or unloading from said tool magazine;
 a standby magazine which has tool holding means by which said tools loaded or unloaded by said tool shifter are temporarily held and stand by; and
 an automatic tool changer which is arranged to change said tool held in said standby magazine for said tool fitted to a spindle;
 said tool shifter translating said tools for delivering operations between said tool magazine and said standby magazine, said automatic tool changer also translating said tools for delivering operations between said standby magazine and said spindle, wherein said standby magazine has a plurality of said tool holding means which are provided on an output shaft of a rotation indexing mechanism and which come to rest at respective delivery positions to/from said tool shifter and said automatic tool changer; and wherein said tool holding means of said standby magazine are arranged to hold said tool such that the axis of said tool held thereby tilts at a predetermined angle relative to the rotational axis of said output shaft so that the direction of axis of said tool upon the translation by said tool shifter is different from the direction of axis of said tool upon the translation by said automatic tool changer.

2. The automatic tool changing apparatus according to claim 1, wherein said plurality of tool holding means of said standby magazine are arranged equiangularly around said output shaft.

3. The automatic tool changing apparatus according to claim 2, wherein the number of said plurality of tool holding means is 2n (n is a natural number), said rotation indexing mechanism having an indexing rotation angle of 360/2n degrees.

4. The automatic tool changing apparatus according to claim 1, wherein said tool holding means of said standby magazine have a tilt of 45 degrees, and wherein the rotational angle between said delivery position to/from said tool shifter and said delivery position to/from said automatic tool changer is 180 degrees.

5. The automatic tool changing apparatus according to claim 2, wherein said tool holding means of said standby magazine have a tilt of 45 degrees, and wherein the rotational angle between said delivery position to/from said tool shifter and said delivery position to/from said automatic tool changer is 180 degrees.

6. The automatic tool changing apparatus according to claim 3, wherein said tool holding means of said standby magazine have a tilt of 45 degrees, and wherein the rotational angle between said delivery position to/from said tool shifter and said delivery position to/from said automatic tool changer is 180 degrees.

7. The automatic tool changing apparatus according to any one of the preceding claims, wherein said tool holding means of said tool magazine and said standby magazine are in the form of recesses which each axially removably receive and hold an axial end of said tool, and wherein said tool shifter, when translating said tool between said tool magazine and said standby magazine for delivering operation, travels in the axial direction of said tool for insertion or removal of said tool into or from said recess.

8. The automatic tool changing apparatus according to any one of claims 1 to 6, wherein said tool holding means of said tool magazine and said standby magazine are in the form of clamps which each radially releasably grip a tool pot having an recess for axially removably receiving and holding an axial end of said tool, and wherein said tool shifter translates said tool together with said tool pot between said tool magazine and said standby magazine, for delivering operation.

9. The automatic tool changing apparatus according to claim 8, wherein one of said tool magazine and said standby magazine is translatable toward the other to function as said tool shifter.

* * * * *